United States Patent
Louey et al.

(10) Patent No.: US 10,343,503 B2
(45) Date of Patent: Jul. 9, 2019

(54) LINEAR MOTOR ACTUATED MOONROOFS

(71) Applicant: Ford Global Technologies LLC, Dearborn, MI (US)

(72) Inventors: Andrew Louey, Carlton North (AU); Graeme Cameron, Ivanhoe (AU)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/982,854

(22) Filed: May 17, 2018

(65) Prior Publication Data

US 2019/0054808 A1    Feb. 21, 2019

(30) Foreign Application Priority Data

Aug. 17, 2017    (CN) .......................... 2017 1 0708689

(51) Int. Cl.
| | | |
|---|---|---|
| *B60J 7/057* | (2006.01) | |
| *B60J 7/00* | (2006.01) | |
| *H02K 41/03* | (2006.01) | |

(52) U.S. Cl.
CPC ........... *B60J 7/0573* (2013.01); *B60J 7/0046* (2013.01); *H02K 41/03* (2013.01)

(58) Field of Classification Search
CPC ......... B60J 7/053; B60J 7/0573; H02K 41/03; H02K 41/02; H02K 41/031; H02K 41/033
USPC .............................................. 296/223, 222
See application file for complete search history.

(56) References Cited

U.S. PATENT DOCUMENTS

| | | | | |
|---|---|---|---|---|
| 6,664,664 B2* | 12/2003 | Botos | ....................... | H02K 3/26 310/12.22 |
| 7,603,811 B2* | 10/2009 | Renke | ................... | E05F 15/697 49/349 |
| 2014/0077831 A1 | 3/2014 | Kordmann et al. | | |

FOREIGN PATENT DOCUMENTS

| | | |
|---|---|---|
| CN | 106130414 A | 11/2016 |
| DE | 3739506 * | 1/1989 |
| DE | 3739506 A1 | 6/1989 |
| DE | 19540769 C1 | 11/1996 |
| JP | 0718949 U | 4/1995 |
| WO | 2014079520 A2 | 5/2013 |

* cited by examiner

*Primary Examiner* — Dennis H Pedder
(74) *Attorney, Agent, or Firm* — Vichit Chea; Kolitch Romano LLP (57) ABSTRACT

Linear motor actuated moonroofs are provided to include first and second channels and a glass sheet with a first and second edge each contained in the first and second channel, respectively. Each of the first and second channel has a plurality of magnets, which are configured to interact with a plurality of coils positioned on the top and/or bottom surface of the glass sheet proximate to the first and second edges. The plurality of coils are selectively energized by a control module to induce a movement of the glass sheet relative to the first and second channels. In some examples, the moonroof and associated components are contained within a cassette. The plurality of coils are preferably affixed to the glass sheet surfaces by a lithographic or silk-screen printing process.

19 Claims, 4 Drawing Sheets

LINEAR MOTOR ACTUATED MOONROOFS

RELATED APPLICATION

This application claims the benefit of Chinese Patent Application No.: CN 201710708689.7 filed on Aug. 17, 2017, the entire contents thereof being incorporated herein by reference.

FIELD

The present disclosure relates generally to vehicle window drive mechanisms, in particular, powered moonroofs for vehicles where the glass panel is moved between open and closed positions via one or more linear motors.

BACKGROUND

Moonroofs are popular options on vehicles of all types, as they allow additional light into a vehicle's interior, as well as provide a view above the car. Moonroofs are often configured with a powered drive mechanism that allows the moonroof to open to varying degrees, depending upon the moonroof's configuration, thereby allowing fresh air to enter and hot air to easily escape a vehicle's interior.

Known powered moonroofs are not entirely satisfactory for the range of applications in which they are employed. For example, existing powered moonroof mechanisms can be bulky, consisting of a somewhat bulky conventional DC motor that is mechanically connected to a geared drive. The geared drive in turn converts the motor's rotary motion into a linear motion, which is then imparted to the moonroof's glass panel by way of a cable mechanism that is attached to the glass panel. This type of drive is known as a "regulator", and has long been used in vehicle power window mechanisms.

This type of mechanism tends to be bulky, requiring space for a relatively large drive motor and its associated geared drive and cable mechanism. Larger moonroofs require correspondingly larger motors, and more robust geared drives and cables to support the greater forces required to move larger panels. Vehicle designers must provide such space in the form of one or more cavities in a vehicle's roof to accommodate a moonroof utilizing a conventional drive mechanism. These cavities can increase the size and bulk of a vehicle roof, and present a potential obstacle that must be avoided when designing or incorporating safety features such as a roll bar that must also pass through a vehicle's roof. The conventional sunroof cassette also lowers headroom significantly. In addition, conventional moonroof drive mechanisms can be somewhat noisy, generating noise similar to that of a power window mechanism.

Thus, there exists a need for moonroofs with a power drive mechanism that improves upon and advances the design of known powered moonroofs, including consuming less package space, easily scaling to larger sized moonroofs, and providing a potentially quieter mechanism. One solution is to use a linear motor to directly drive the moonroof, where the glass panel can be directly attached to the rotor portion of the linear motor. Such an implementation avoids the necessity of a separate motor, gear drive and cable assembly, and can potentially operate more quietly, as no gearing is necessary to power the moonroof provided the components of the linear motor are configured properly. Examples of new and useful powered moonroofs relevant to the needs existing in the field are discussed below.

In the prior art, German patent publication DE 195 40 769 C1 to Hahn et al. ("Hahn") discloses a moonroof that is driven by a linear motor assembly. Specifically, Hahn discloses a channel-shaped stator equipped with a series of coils that magnetically engage with a rail-shaped guide equipped with magnets, that is configured as a rotor. The moonroof's glass sheet is attached to the rail-shaped guide, which can then impart a force along the axis of travel for the glass sheet when the stator coils are energized.

An alternative arrangement where the rotor contains coils to be energized and the stator is comprised of magnets is found in U.S. Pat. No. 6,664,664 to Botos et al. ("Botos"). Botos describes a linear motor where the coils are placed in the rotor, which is disclosed as a printed circuit board where coils are comprised of a series of electrical traces, arranged in several layers. The layers are energized simultaneously to create a directional magnetic field which interacts with the stator magnets to cause the linear rotor to move.

SUMMARY

In a first aspect of the present disclosure, a linear-motor actuated power moonroof comprises a glass sheet with a first edge, a second edge disposed substantially parallel to and distal from the first edge, a first surface defined between the first edge and second edge, and a second surface opposite the first side. A first plurality of electrically conductive coils are directly affixed to the glass sheet proximate to the first edge; a first channel sized to substantially surround, and disposed around the first edge; and a first plurality of magnets disposed within the channel and configured to interact with the first plurality of coils. Energizing one or more of the first plurality of coils creates a magnetic field that interacts with one or more of the first plurality of magnets and causes the glass sheet to move relative to the channel.

According to another embodiment, one or more hall effect sensors are configured to allow the position of the glass sheet within the channel to be determined.

According to another embodiment, the moonroof further comprises a control module electrically connected to the first plurality of coils and configured to selectively energize one or more of the first plurality of coils to control the movement of the glass sheet relative to the channel.

According to another embodiment, the moonroof is contained within a cassette configured to be installed in a vehicle roof.

According to another embodiment, the first plurality of coils are affixed to the first surface of the glass sheet and a rubbing strip is fixed to the second surface of the glass sheet.

According to yet another embodiment, the first plurality of coils are further affixed to the second surface of the glass sheet.

According to another embodiment, the first plurality of coils are affixed to the glass sheet by printing, painting, or a lithographic process.

According to another embodiment, the moonroof further comprises a second plurality of electrically conductive coils affixed to the glass sheet proximate to the second edge; a second channel sized to substantially surround and which is disposed around the second edge; and a second plurality of magnets disposed within the second channel and configured to interact with the second plurality of coils. The second plurality of coils is energized in cooperation with the plurality of coils to cause the glass sheet to move relative to the channel and second channel.

According to another embodiment, the glass sheet includes an electro-chromic capability that is configured to allow the optical transmissivity of the glass sheet to be varied.

According to still another embodiment, the channel is affixed to a vehicle substrate.

In a second aspect of the present disclosure, a power moonroof for a vehicle comprises a cassette; a glass sheet with a first surface and a second surface, the glass sheet disposed in the cassette; and a linear motor including a plurality of electrically conductive coils formed on a portion of the first surface proximate to a first edge of the glass sheet. A magnet assembly is disposed along a length of the cassette and inside the cassette. The plurality of coils and the magnet assembly constitute a linear motor, and energization and de-energization of each of the plurality of coils creates a force to move the glass sheet in a length direction of the cassette.

According to another embodiment, the magnet assembly is contained within a channel shaped to substantially enclose the plurality of coils.

According to another embodiment, the cassette is configured to mount in the roof of a vehicle.

According to another embodiment, the plurality of coils are energized and de-energized by a control module.

According to another embodiment, the control module determines how to energize and de-energize the plurality of coils based upon the position of the glass sheet relative to the magnet assembly, with the position of the glass sheet detected by a Hall Effect sensor in electrical communication with the control module.

According to still another embodiment, the plurality of coils are printed onto the first and second surfaces of the glass sheet by printing, painting, or a lithographic process and then heat fused onto the glass surfaces to form a robust cleanable layer.

According to yet another embodiment, the glass sheet has a second edge; and a second plurality of electrically conductive coils are formed on a portion of the first surface proximate to the second edge.

In a third aspect of the present disclosure, a vehicle with a power moonroof comprises an opening in the vehicle roof with a first side and a second side parallel to and disposed distal from the first side, and a moonroof. The moonroof further comprises a first channel disposed in the first side of the vehicle roof and a second channel disposed in the second side of the vehicle roof; a glass sheet with a first edge and a second edge parallel to and disposed distal from the first edge, and sized so that when placed within the opening the first edge is substantially covered by the first channel and the second edge is substantially covered by the second channel; a first plurality of electrically conductive coils disposed upon the glass sheet proximate to the first edge; a second plurality of electrically conductive coils disposed upon the glass sheet proximate to the second edge; a first plurality of magnets disposed within the first channel and a second plurality of magnets disposed within the second channel; and a control module in electrical communication with the first and second plurality of coils and configured to selectively energize the first and second plurality of coils. Energizing the first and second plurality of coils causes the coils to magnetically interact with the first and second plurality of magnets, respectively, causing the glass sheet to move relative to the first and second channels.

According to one embodiment, the moonroof is contained in a cassette.

According to another embodiment, the first and second plurality of coils are formed on the glass sheet by printing, painting, or a lithographic process.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed linear motor actuated moonroofs will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various linear motor actuated moonroofs are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5, an example of a linear motor actuated moonroof, moonroof 100, will now be described.

Figure 1:
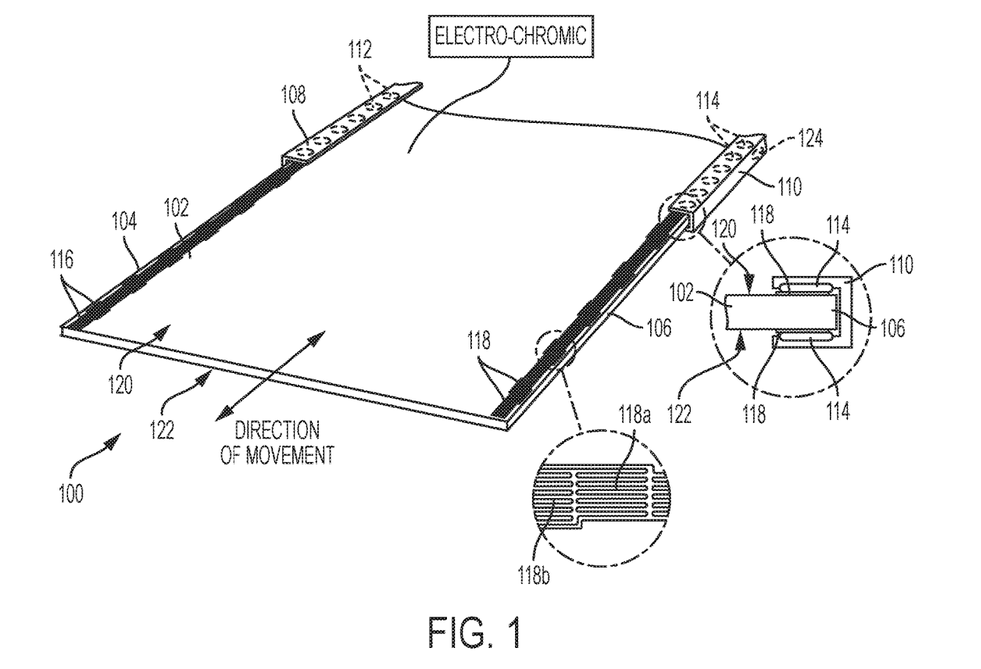
FIG. 1 is a perspective view of a first example of a linear motor actuated moonroof according to one embodiment of the present disclosure.

Moonroof 100, in keeping with elements common to all moonroofs, is comprised essentially of a glass sheet that primarily moves along a single axis, the axis typically defined as being parallel to the longitudinal axis of the vehicle into which moonroof 100 is installed. The glass sheet is supported on its sides that run along its axis of movement, typically by support rails or channels that extend along the glass sheet's axis of movement, these support rails or channels including linear motor mechanisms as will be described below. Depending on the vehicle and moonroof configuration, the moonroof may be equipped with additional mechanism(s) that allow at least the glass sheet to translate vertically out of its normal plane of movement at one end of its travel, going into or coming out of a closed configuration. This can allow the glass sheet to dock into a closed configuration that is substantially flush with a vehicle roof, and alternately drop down below the plane of the vehicle roof to line up with a travel path to allow the glass sheet to open.

In the disclosed invention, moonroof 100 improves on the prior art by using one or more linear motors integrated into moonroof 100 to drive the moonroof's panel. The linear motors are preferably incorporated into the support rails or channels, as well as on the portions of the glass sheet that are proximate to the support rails or channels. Moonroof 100 thus functions to provide a moonroof that eliminates the requirement for a bulky separate drive motor and associated mechanism. Furthermore, by placing the rotor coils directly onto the glass sheet of the moonroof, the moonroof mechanism can be relatively light and simple. Moonroof 100, including the glass sheet, linear motors, support structures, and controller, can be incorporated into a cassette to simplify installation into a vehicle, which is particularly beneficial during vehicle construction on an automated or semi-automated assembly line. The reader will appreciate from the figures and description below that moonroof 100 addresses shortcomings of conventional moonroofs and associated drive systems.

For example, by incorporating the moonroof's glass sheet as part of the drive mechanism, moonroof 100 eliminates the need for an external drive motor and associated mechanism, which greatly reduces or eliminates the need for extra space in the roof or other vehicle structure to accommodate the motor and drive mechanism. Further, by eliminating the drive mechanism, moonroof 100 provides a potentially quieter, potentially silent, mechanism for opening and closing moonroof 100. Further, the opening and closing of the moonroof 100 can be quick in operation. Furthermore, the moonroof may be configured to have a preset memory positions so that the moonroof can stop at the preset positions such as stopping at ¼, ½ and ¾ of a traveling path. As the drive motor is integrated with the glass sheet of moonroof 100, the drive motor can correspondingly scale up in size as the size of moonroof 100 increases.

Moonroof 100 includes a glass sheet 102 with a first edge (or a first side portion) 104, a second edge (or a second side portion) 106 disposed substantially parallel to and distal from first edge 104, a first surface 120 defined between first edge 104 and second edge 106, and a second surface 122 opposite first surface 120. A plurality of electrically conductive coils 116 and 118 are directly affixed to glass sheet 102 proximate to first edge 104 and second edge 106, respectively. Channels 108 and 110 are sized to substantially surround and are disposed around, first edge 104 and second edge 106, respectively, to at least substantially cover coils 116 and 118. A plurality of magnets 112 and 114 are disposed within each channel 108 and 110, respectively, and configured to interact with plurality of coils 116 and 118. Energizing one or more of the plurality of coils 116 and 118 creates a magnetic field that interacts with plurality of magnets 112 and 114, thereby causing glass sheet 102 to move relative to channels 108 and 110.

As can be seen in FIG. 1, in a preferred embodiment, glass sheet 102 is configured to have at least two opposing edges, first edge 104 and second edge 106, and further defines a first surface 120 and a second surface 122. Glass sheet 102 is constructed using materials and techniques well-known in the automotive industry, such as using laminated or tempered glass, or potentially out of materials other than glass, such as composite or suitable plastics such as polycarbonate or acrylic. Glass sheet 102 may be equipped with an electro-chromic layer or coating that allows the optical transmissivity of glass sheet 102 to be altered by application of an appropriate electric current.

First edge 104 and second edge 106 each receive a plurality of coils 116 and 118 to form the rotor of the linear electric motor and run within channels 108 and 110 respectively. Glass sheet 102 travels along a single axis that is parallel to the longitudinal axis of both channel 108 and channel 110. For first edge 104 and second edge 106 to maintain proper positioning of coils 116 and 118 within channels 108 and 110, respectively, first edge 104 must be configured parallel to second edge 106. It will also be appreciated by a person skilled in the relevant art that each of first edge 104 and second edge 106, acting as the rotor in a linear motor, must be sufficiently straight to allow proper positioning and alignment within its respective channel 108 and 110 so that coils 116 and 118, respectively, maintain correct positioning with respect to the corresponding magnets 112 and 114 in each channel 108, 110. In some embodiments, one of the first surface 120 adjacent to the first edge 104 and the second surface 122 adjacent to the second edge 106 may include a low friction rubbing strips to help align travel more precisely. Alternatively, the low friction rubbing strips may be disposed on the channels 108 and 110. While in the disclosed embodiment glass sheet 102 is supported by or proximate to channels 108 and 110, which are disposed proximate to opposing first edge 104 and second edge 106, in other embodiments, moonroof 100 may utilize greater than or fewer than two channels.

Referring to the inset in FIG. 1, it is seen that channels 108 and 110 have a "C" shaped cross-section, sized to receive first edge 104 or second edge 106, and extend so as to cover a portion of first surface 120 and second surface 122 that is proximate to first edge 104 or second edge 106. Disposed upon the interior surfaces of channels 108, 110 that are parallel to first surface 120 and second surface 122 are a plurality of magnets 112, 114 (as seen in the inset), that are spaced at regular intervals so as to line the interior of each channel 108, 110. Channels 108 and 110 can be fabricated from any suitable material such as plastic, metal, composites, wood, rubber, or any other suitable material now known or later developed. Suitable material will not interfere with the interaction of magnets 112 and 114 with coils 116 and 118. Channels 108 and 110 are attached to a substrate that is fixed relative to glass sheet 102, to allow channels 108 and 110 to act as stators to glass sheet 102, which is configured as a rotor in the linear motor arrangement. A portion of channels 108 and 110 can be configured to act as supports for glass sheet 102 as it moves through channels 108 and 110. Additionally or alternatively, the rubbing strip may be inserted into the channel 108 and 110 as support and an accurate guide.

In one embodiment, magnets 112 and 114 are permanent magnets, fabricated from known technologies such as neodymium, samarium-cobalt, alnico, ferrite, or other similarly suitable magnetic material. Implementing magnets 112 and 114 reduces the complexity of moonroof 100 as power need only be provided to coils 116 and 118 to cause glass sheet 102 to move. These coils 116 and 118 can be controlled using methods for controlling a permanent magnet brushless DC motor which are well-known in the art. Alternative embodiments can implement magnets 112 and 114 as electromagnets with coils that can be selectively energized via a controller. Such an arrangement may allow finer control over the action of the linear motor mechanisms for certain applications.

The rotor portion of the linear motors is comprised of coils 116 and 118. Coils 116 and 118 are preferably implemented using a conductive paint or ink, which can be directly screened or printed onto first surface 120 and/or second surface 122 of glass sheet 102. Such printing methods are known in the art and used for applications such as printing heating elements onto vehicle windows for defrosting, and can be used for the creation of coil patterns. The ink preferably is of a low-resistance character to minimize heating. In some embodiments, coils 116 and 118 may be fixed to the first surface 120 and/or second surface 122 of glass sheet 103 via printing, painting, or a lithographic process. Further, coils 116 and 118 may be fixed to the first surface 120 and/or second surface 122 of glass sheet 103 via printing, painting, or a lithographic process and then heat fused onto the glass surfaces to form a robust easily cleanable layer. The inset in FIG. 1 shows one possible pattern for printing the coils, with a first coil set 118a and second coil set 118b. It will be observed that first coil set 118a is comprised of every other coil, interleaved with the members of second coil set 118b. All coils in each coil set are electrically connected and are energized simultaneously, but are electrically isolated from all coils in the other coil set. Thus, all coils in first coil set 118a can be energized simultaneously independently from all coils in second coil set 118b, which likewise can be independently energized. This arrangement is well-known in the relevant art as a way of operating a linear motor, and will be described in greater detail below with reference to FIG. 2.

While the preferred embodiment shows coils 116 and 118 printed on both first surface 120 and second surface 122, it should be understood that this is only one possible embodiment. Other embodiments may limit the coils only to one side and/or one edge of glass sheet 102. In such embodiments, the corresponding channel 108 or 110 may only have magnets on one internal face, where glass sheet 102 only has coils on one side, may only have one channel where only one edge of glass sheet 102 is configured as a linear motor, or a combination of both.

Figure 2:
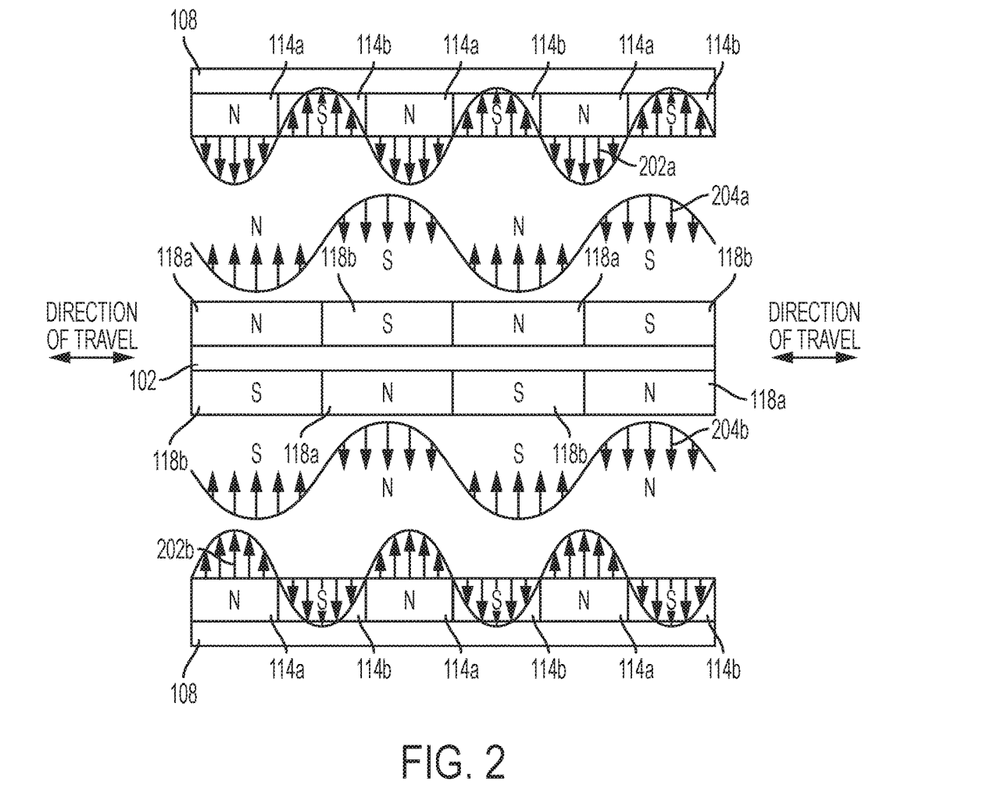
FIG. 2 is a schematic view of the arrangement and interaction between stator and rotor magnetic forces for the linear motor actuated moonroof of FIG. 1.

In the example shown in FIG. 2, the relationship between the stator and rotor, and the interactions between the accompanying magnetic fields is depicted. Magnets 114 are divided into two interleaved groups, magnet group 114a, where the magnets have their north poles facing towards the interior of channel 108, towards glass sheet 102, and magnet group 114b, where the magnets have their south poles facing towards the interior of channel 108. As discussed above, coils 118 are split into two interleaved groups, first coil set 118a and second coil set 118b. Although FIG. 2 depicts first coil set 118a has having a north polarization and second coil set 118b having a south polarization, a person skilled in the art will understand that during the operation of the linear motor, the polarization of each coil set can toggle between north and south polarizations by reversing the current flow through each coil set. As the linear motor operates the polarization will toggle between polarizations in a timed fashion to propel the glass sheet 102, as rotor, in the desired direction of travel.

The magnetic field generated by magnets 114 is depicted by waveforms 202a and 202b. Note that the lines depicting the magnetic forces are for illustration purposes only, to connote that the north and south magnetic poles have opposing magnetic forces that interact with coils 118. Likewise, the magnetic field generated by coils 118 is depicted by waveforms 204a and 204b. It can be seen that the spacing of coils 118 is broader than the spacing of magnets 114, with the result being a broader spread of the generated rotor magnetic fields, as shown by waveforms 204a and 204b. This difference in spacing is necessary to allow the rotor of the linear motor to move relative to the stator of channel 108; identical spacing of coils 118 to magnets 114 would result in frequent cogging and stalling of the motor. A broader spacing allows the rotor magnetic fields to overlap the magnetic fields of magnets 114 at any given position, which creates an ongoing push-pull effect upon energization of coils 118. Rotating the polarization of coils 118 by reversing the current flow direction at precisely timed intervals causes glass sheet 102 to advance in the desired direction of travel. Varying the timing of polarization rotation, as well as the length of time that each coil set 118a and 118b is energized can allow control over the speed of travel of glass sheet 102 and/or create a braking effect to slow the travel of glass sheet 102.

Figure 3:
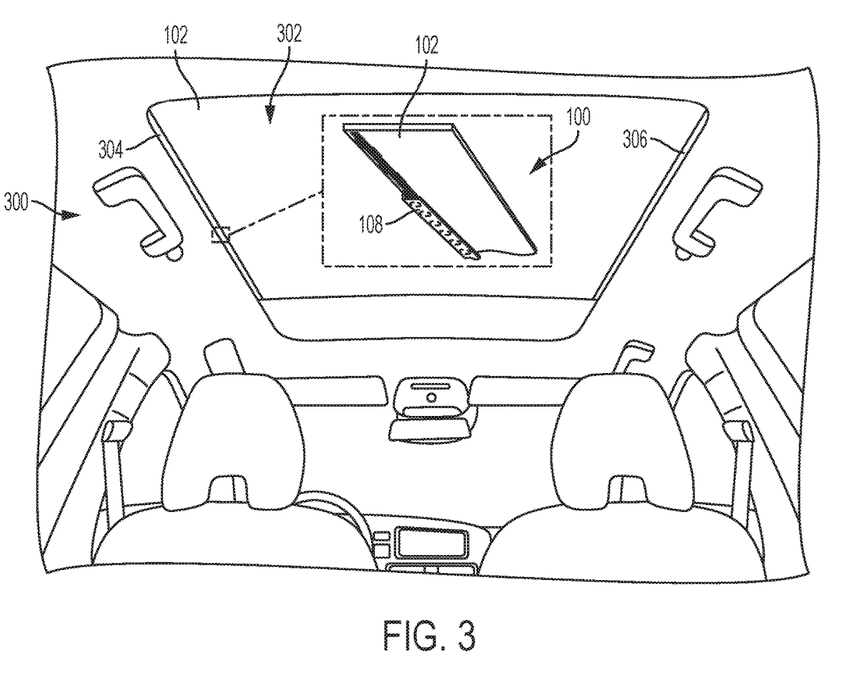
FIG. 3 is a perspective view from the interior of a vehicle showing one possible installation of the linear motor actuated moonroof of FIG. 1.

Turning to FIG. 3, a possible installation of moonroof 100 is depicted, with an inset showing half of moonroof 100. A vehicle 300 has an opening 302 created in its roof, into which is installed moonroof 100. One of the side channels, channel 108, is shown as being installed into side 304 in opening 302, the location that the support rail of a conventional moonroof is located. A person skilled in the relevant art will understand that the opposing side 306 of opening 302 will contain the other channel 110 of moonroof 100 in the preferred embodiment. Glass sheet 102 is sized to fill opening 302, and when retracted slides rearward out of opening 302 to open the roof to outside of the vehicle.

Figure 4:
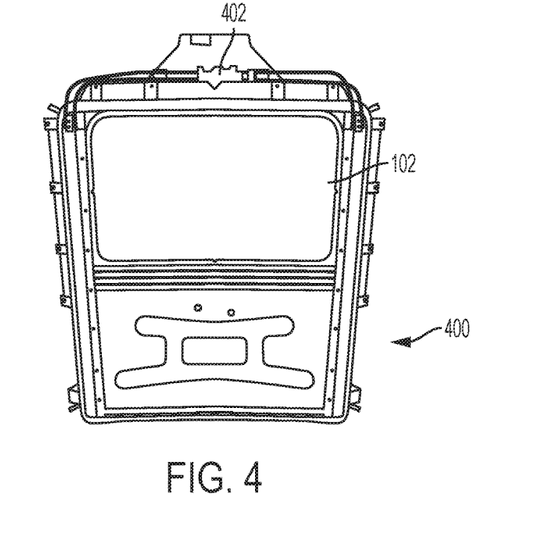
FIG. 4 is a top view of the linear motor actuated moonroof of FIG. 1 as contained in a cassette for mounting in a vehicle.

FIG. 4 depicts a cassette 400 into which moonroof 100 can be installed as a unit, to facilitate ease of installation into vehicle 300. Cassettes such as cassette 400 are known in the art, and preferably are configured to carry all necessary operating components of moonroof 100, including control module 402. Cassette 400 thus is quickly installed into vehicle 300 by fastening it into position, and connecting control module 402 to power supply of vehicle 300, typically by way of a quick-connecting wiring harness. Cassette 400, as depicted, is configured to completely contain glass sheet 102 both in open and closed positions. It should be appreciated that cassette 400 is not necessary to the operation of moonroof 100. Moonroof 100 can be installed in a component fashion, without the use of a cassette.

Control module 402 is implemented using any well-known technologies for controlling a brushless motor, such as a brushless permanent magnet DC motor (BDCM). Such technologies can include a programmable microcontroller and switching circuitry. Control module 402 can include inputs such as a Hall-Effect sensor 124 (see FIG. 1), which can be located within one of the channels 108 and/or 110, or elsewhere proximate to the travel path of glass sheet 102, to detect the location and, in some embodiments, the speed of glass sheet 102. This feedback allows control module 402 to determine when to control the linear motors to arrest the travel of glass sheet 102. Control module 402 can also be equipped with an input from one or more sensors to detect a possible obstruction within the travel path of glass sheet 102. Such sensors are well known in the automotive arts and have been commonly used to prevent pinching or crushing of obstructions by power windows, such as where a person accidently places their fingers within the path of a closing power window. Alternatively or in addition, control module 402 can use current feedback from one or both linear motors that results when glass sheet 102 is stalled, due to an obstruction in opening 302. If a linear motor is stalled mid-travel, a current spike results; this current spike can be detected by control module 402, which can then either immediately arrest the travel of glass sheet 102, or can reverse its travel.

Figure 5:
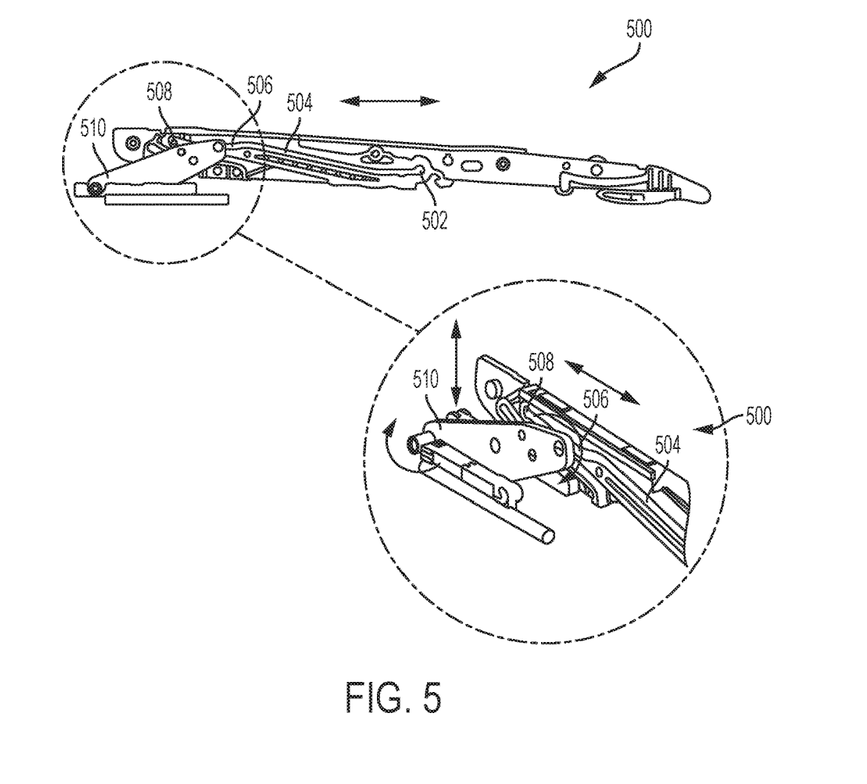
FIG. 5 is a side elevation view of a knuckle assembly that causes the linear motor actuated moonroof of FIG. 1 to translate vertically at the start or end of its travel.

Referring to FIG. 5, a lift mechanism 500 for causing moonroof 100 to translate vertically is depicted. Most vehicles have the moonroof glass travel into a cavity in the roof, and as such the glass is below the exterior surface of the roof while it is being retracted or closed. The glass preferably sits roughly flush with the roof's exterior surface when the moonroof is closed. As such, the glass must initially drop below the roof's exterior surface prior to retracting, and must rise up to the exterior surface when the glass is again closed. Lift mechanism 500 provides a pivoting arm mechanism that translates the lateral movement of glass sheet 102 into a vertical movement. It should be appreciated that in some implementations, channels 108 and 110, as the stators in the linear motors, will also rise with glass sheet 102; for such implementations, glass sheet 102 refers to both glass sheet 102 as well as channels 108 and 110. Point 502 is the start and end travel point for glass sheet 102 (and its associated components) for when glass sheet 102 is being closed or opened, respectively. Glass sheet 102 travels along guide track 504 as it opens or closes, where it eventually encounters cam point 506. Upon encountering cam point 506, the motion of glass sheet 102 imparts a force onto knuckle and pivot assembly 510, which translates the force into a vertical lifting motion, acting to either raise or lower glass sheet 102, depending on whether glass sheet is being closed or opened, respectively. Eventually glass sheet 102 encounters point 508, which is the final resting/starting point for glass sheet 102 at the end of its travel. Where glass sheet 102 is being closed, point 508 is encountered once glass sheet is also fully lifted into a closed position.

In other implementations, a separate motor can be used to independently lift glass sheet 102. Such a mechanism moves channels 108 and 110 relative to glass sheet 102 so that glass sheet 102 disengages and reengages channels 108 and 110 to move into a closed position or into position to retract, respectively.

Although moonroof 100 is depicted as being dedicated to use in a vehicle use, the linear motor configuration of moonroof 100 can be implemented in other vehicle windows, such as power driver and passenger windows. In such implementations, the sizes and lengths of channels 108 and 110 and corresponding width of coils 116 and 118 may vary from each other depending upon the particular window shape. Some implementations may use only one linear motor, with the other window edge simply engaging a support rail. Use of a linear motor actuated window can result in a space savings in a door interior, which must provide a large cavity to load side window regulators and tracks for a motor and regulator mechanism, weakens the door structure and allows a greater NVH transmission path with convention power window mechanisms.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A power moonroof, comprising:
  a glass sheet with a first edge, a second edge disposed substantially parallel to and distal from the first edge, a first surface defined between the first edge and the second edge, and a second surface opposite the first surface;
  a first plurality of electrically conductive coils directly affixed to the first surface of the glass sheet proximate to the first edge and the first plurality of electrically conductive coils are formed as a single layer;
  a first channel sized to substantially surround, and which is disposed around the first edge; and
  a first plurality of magnets disposed within the channel and configured to interact with the first plurality of coils;
  wherein energizing one or more of the first plurality of coils creates a magnetic field that interacts with one or more of the first plurality of magnets and causes the glass sheet to move relative to the channel and the glass sheet is incorporated as a part of a drive mechanism.

2. The moonroof of claim 1, further comprising one or more hall effect sensors configured to allow a position of the glass sheet within the channel to be determined.

3. The moonroof of claim 1, further comprising a control module electrically connected to the first plurality of coils and configured to selectively energize one or more of the first plurality of coils to control the movement of the glass sheet relative to the channel.

4. The moonroof of claim 3, wherein the moonroof is contained within a cassette configured to be installed in a vehicle roof.

5. The moonroof of claim 1, wherein the first plurality of coils are further directly affixed to the second surface of the glass sheet proximate to the first edge and the first plurality of electrically conductive coils are formed as a single layer and the glass sheet is positioned between the first plurality of electrically conductive coils.

6. The moonroof of claim 1, wherein the first plurality of coils are affixed to the glass sheet by a printing process, a painting process, or a lithographic process.

7. The moonroof of claim 5, further comprising:
a second plurality of electrically conductive coils directly affixed to the first surface and the second surface of the glass sheet proximate to the second edge, the second plurality of electrically conductive coils are formed as a single layer on the first surface and the second surface, respectively and the glass sheet is positioned between the second plurality of electrically conductive coils;
a second channel sized to substantially surround and which is disposed around the second edge; and
a second plurality of magnets disposed within the second channel and configured to interact with the second plurality of coils;
wherein the second plurality of coils is energized in cooperation with the first plurality of coils to cause the glass sheet to move relative to the first channel and second.

8. The moonroof of claim 1, wherein the glass sheet includes an electro-chromic capability that is configured to allow the optical transmissivity of the glass sheet to be varied.

9. The moonroof of claim 1, wherein the first channel is affixed to a vehicle substrate.

10. A power moonroof for a vehicle, comprising:
a cassette connected to a roof of a vehicle;
a glass sheet with a first surface and a second surface, the glass sheet disposed in the cassette; and
a linear motor including:
a first plurality of electrically conductive coils directly formed as a single layer on the first and second surfaces proximate to a first edge of the glass sheet, respectively; and
a first plurality of magnets disposed along a length of the cassette and inside the cassette;
wherein the first plurality of coils and the first plurality of magnets constitute a linear motor, and energization and de-energization of each of the first plurality of coils creates a force to move the glass sheet in a length direction of the cassette channel and the glass sheet is disposed between the first plurality of the electrically conductive coils and incorporated as a part of a drive mechanism.

11. The moonroof of claim 10, wherein the first plurality of magnets is contained within a channel shaped to substantially enclose the first plurality of coils.

12. The moonroof of claim 10, wherein the cassette is configured to mount in the roof of a vehicle.

13. The moonroof of claim 10, wherein the first plurality of coils are energized and de-energized by a control module.

14. The moonroof of claim 13, wherein the control module determines how to energize and de-energize the first plurality of coils based upon a position of the glass sheet relative to the first plurality of magnets, with the position of the glass sheet detected by a hall effect sensor in electrical communication with the control module.

15. The moonroof of claim 10, wherein the first plurality of coils are affixed onto the first and second surfaces of the glass sheet by a printing process, a painting process, or a lithographic process.

16. The moonroof of claim 10, further comprising a second plurality of electrically conductive coils directly formed as a single layer on the first and second surfaces proximate to a second edge of the glass sheet.

17. A vehicle with a power moonroof, comprising:
an opening in the vehicle roof with a first side and a second side parallel to and disposed distal from the first side; and
a moonroof further comprising:
a first channel disposed in the first side and a second channel disposed in the second side of the opening of the vehicle roof;
a glass sheet with a first edge and a second edge parallel to and disposed distal from the first edge, a first surface defined between the first edge and the second edge, and a second surface opposite the first surface, wherein the glass sheet is sized so that when placed within the opening of the vehicle roof, the first edge is substantially covered by the first channel and the second edge is substantially covered by the second channel;
a first plurality of electrically conductive coils directly formed as a single layer on the first surface of the glass sheet proximate to the first edge;
a second plurality of electrically conductive coils directly formed as a single layer on the first surface of the glass sheet proximate to the second edge;
a first plurality of magnets disposed within the first channel and a second plurality of magnets disposed within the second channel; and
a control module in electrical communication with the first and second plurality of coils and configured to selectively energize the first and second plurality of coils,
wherein energizing the first and second plurality of coils causes the coils to magnetically interact with the first and second plurality of magnets, respectively, causing the glass sheet to move relative to the first and second channels.

18. The vehicle of claim 17, wherein the moonroof is contained in a cassette.

19. The vehicle of claim 17, wherein the first and second plurality of coils are formed on the glass sheet by a printing process, a painting process, or a lithographic process.

* * * * *